J. KIRBY.
ENGINE REVOLUTION INDICATOR
APPLICATION FILED FEB. 17, 1917.
1,241,994.
Patented Oct. 2, 1917.
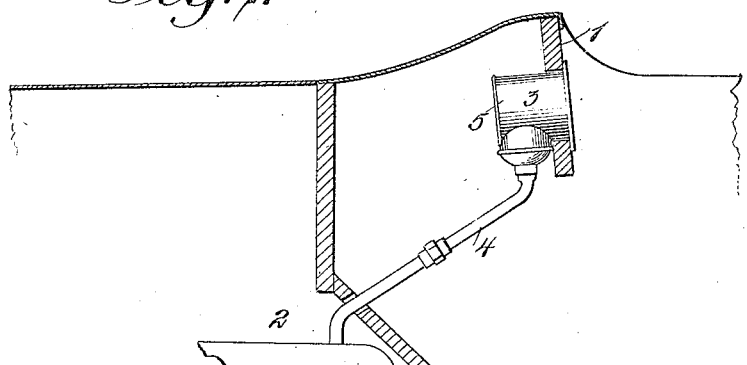
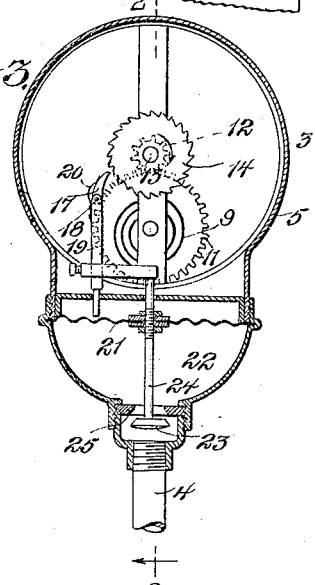
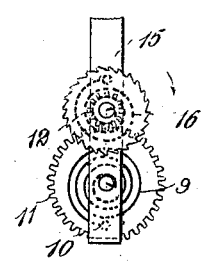
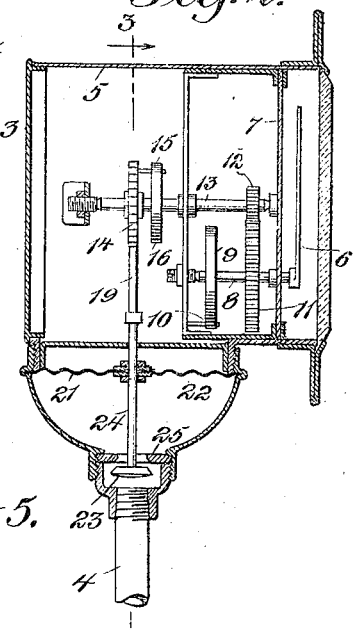
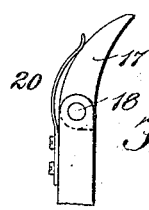
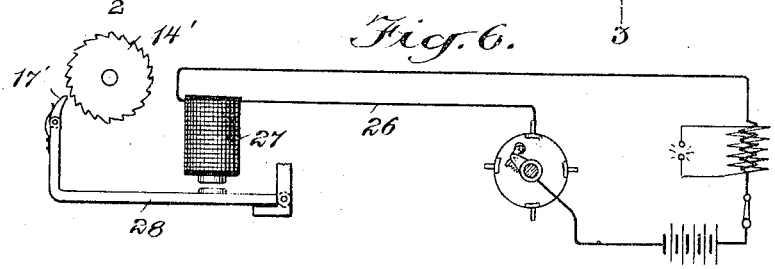
WITNESSES
INVENTOR
J. Kirby.
BY
ATTORNEYS

UNITED STATES PATENT OFFICE.

JOHN KIRBY, OF NEW YORK, N. Y.

ENGINE-REVOLUTION INDICATOR.

1,241,994.

Specification of Letters Patent.

Patented Oct. 2, 1917.

Application filed February 17, 1917. Serial No. 149,207.

*To all whom it may concern:*

Be it known that I, JOHN KIRBY, a subject of the King of Great Britain, and a resident of the city of New York, borough of Manhattan, in the county and State of New York, have invented a new and Improved Engine-Revolution Indicator, of which the following is a full, clear, and exact description.

This invention relates to a revolution indicator or meter especially adapted for use in connection with automobile, motor-boat or other engines, the indicator consisting of a dial calibrated in revolutions per minute and a hand or needle movable with respect thereto and which is actuated by a suitable mechanism set into operation by an impulse during each cycle of operation, whether the engine be of the two or four stroke cycle.

The invention has for its general objects to provide a device of this character which is of comparatively simple and inexpensive construction, reliable and efficient in use, and so designed that it can be operated by the pressure within the cylinder or by the electric impulses in the ignition circuit.

A more specific object of the invention is the provision of an indicator in which the hand is yieldingly held in zero position by a spring and which is moved against the tension of the spring by the winding of another spring which is actuated by a pawl and ratchet device or equivalent means that receives an impulse with each cycle of the engine.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a fragmentary vertical sectional view of the front portion of an automobile showing the revolution indicator mounted on the instrument or work board and connected with the engine;

Fig. 2 is a vertical section of the revolution indicator, the section being taken on the line 2—2, Fig. 3;

Fig. 3 is a vertical section on the line 3—3, Fig. 2;

Fig. 4 is a detail view of the ratchet wheel, gearing and springs;

Fig. 5 is a detail view of the pawl; and

Fig. 6 is a diagrammatic view of a modification in which the device is operated by the ignition system.

In the present instance the invention is shown applied to an automobile engine, but it is not necessarily limited to this use.

Referring to the drawing, 1 designates the instrument or workboard of an automobile, 2 the engine, and 3 the revolution indicator, which is connected with the rear cylinder preferably of the engine by a pipe 4 whereby pressure or compression of the charges is brought to bear upon the indicator to cause the same to register the number of revolutions per minute.

The instrument 3 includes a casing 5 which contains a hand or needle 6 movable over a dial plate 7 having designations to indicate revolutions per minute. The hand 6 is mounted on a shaft 8 which has connected therewith the inner end of a spiral spring 9, the outer end of which is anchored stationary at 10. On the shaft 8 is a gear 11 that meshes with a pinion 12 on a shaft 13. This shaft carries a loosely mounted ratchet wheel 14 which is connected with the outer end 15 of a spiral spring 16, the inner end of which is connected with the shaft 13. A reciprocatory pawl 17 engages the toothed periphery of the ratchet wheel to rotate the same. The pawl is pivoted at 18 on the end of a rod 19, and this pawl is yieldingly engaged with the ratchet wheel by a spring 20. According to the arrangement shown in Fig. 1, fluid pressure is the agency for operating the pawl. For this purpose a diaphragm 21 is suitably connected with the rod 19, and on one side of the diaphragm is a chamber 22 that is connected with the pipe 4. The pressure of the charge during the compression stroke is thus brought to bear on the diaphragm 21 so as to cause the same to bulge upwardly and thereby move the pawl 17 and cause a partial rotation of the ratchet wheel. When the engine is moving rapidly the result is that a succession of rapid impulses is imparted to the ratchet wheel, tending to move the same in a clockwise direction, Fig. 3. As the wheel rotates, the spring 16 winds and turns the shaft 13, which operates through the pinion 12 and gear 11 to turn the shaft 8 against the tension of the spring 9. This causes the needle 6 to move over the dial. Finally a point will be reached when the tension on the spring 9 balances the tension of the spring 16, so that the needle will remain stationary and indicate the revolutions per minute. As the engine slows down, the spring 9 will cause the needle to move backwardly toward zero position.

In order to prevent the high pressure, due to the explosion of the charge in the cylinder, from being brought to bear on the diaphragm, a valve 23 closes communication between the pipe 4 and the chamber 22. This valve, which is connected by a stem 24 with the diaphragm, is adapted to engage a seat 25. The valve is normally off its seat when the diaphragm is neutral, but when the pressure in the pipe 4 becomes excessive it acts on the valve and closes it. The stem 24 extends upwardly above the diaphragm and has a laterally extending arm on which the rod 19 is fastened, as clearly shown in Fig. 3.

Instead of using the pressure within the cylinder for actuating the revolution indicator it is possible to employ the electrical impulses in the ignition system. Thus, as shown in Fig. 6, the ignition circuit 26 contains an electromagnet 27 or equivalent means which operates a lever 28 on which the pawl 17' is mounted, the pawl acting on the ratchet wheel 14' that is operatively connected with the hand or needle of the meter by the same means shown in Fig. 2. When the electromagnet is energized the lever 28 is moved upwardly, and when the electromagnet is deënergized the lever moves downwardly. Thus, the pawl reciprocates once in each cycle just as reliable as if the pressure in the cylinder was the actuating agency.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of an engine, a revolution indicator for the crank shaft of the engine, and means responsive to the pressure condition of the engine for imparting a momentary impulse to the movable element of the indicator during each cycle of operation of the engine.

2. The combination of an engine, with a revolution indicator for the crank shaft of the engine comprising a movable indicating element, a spring yieldingly holding said element in zero position, a second spring arranged to move the indicating element against the tension of the first-mentioned spring, and means responsive to the pressure condition of the engine for imparting an instantaneous impulse to the second spring during each cycle of the engine to tension such spring until the springs are balanced, when the indicating element will indicate the revolutions per minute of the engine.

3. The combination of an engine, a fluid pressure responsive device communicating with the cylinder of the engine, a revolution indicating element, and means between the pressure responsive device and said element for actuating the latter.

4. The combination of an engine, a pressure responsive device communicating with the cylinder of the engine, a revolution indicating element, means between the pressure responsive device and said element for actuating the latter, and a valve for preventing the explosive pressure in the engine cylinder from acting on the pressure responsive device.

5. The combination of an engine, a pressure responsive device communicating with the cylinder of the engine, a revolution indicating element, means between the pressure responsive device and said element for actuating the latter, and a valve connected with the pressure responsive device and arranged to automatically close under the explosive pressure in the engine for preventing such pressure from acting on the pressure responsive device.

6. The combination of an engine, a pipe communicating with the cylinder thereof, a diaphragm arranged to be subjected to pressure in the cylinder through the said pipe, a valve connected with the diaphragm and normally open, whereby the valve prevents excessive pressure from being exerted on the diaphragm, a pawl actuated by the diaphragm, a ratchet wheel actuated by the pawl, a spring connected with the ratchet wheel and adapted to be wound thereby, an indicating element, a gearing between the spring and element, and a second spring normally holding the element in zero position and yieldingly opposing the movement of the element.

JOHN KIRBY.